(No Model.)
D. CAINE.
BEAN HARVESTER.
No. 302,889. Patented Aug. 5, 1884.
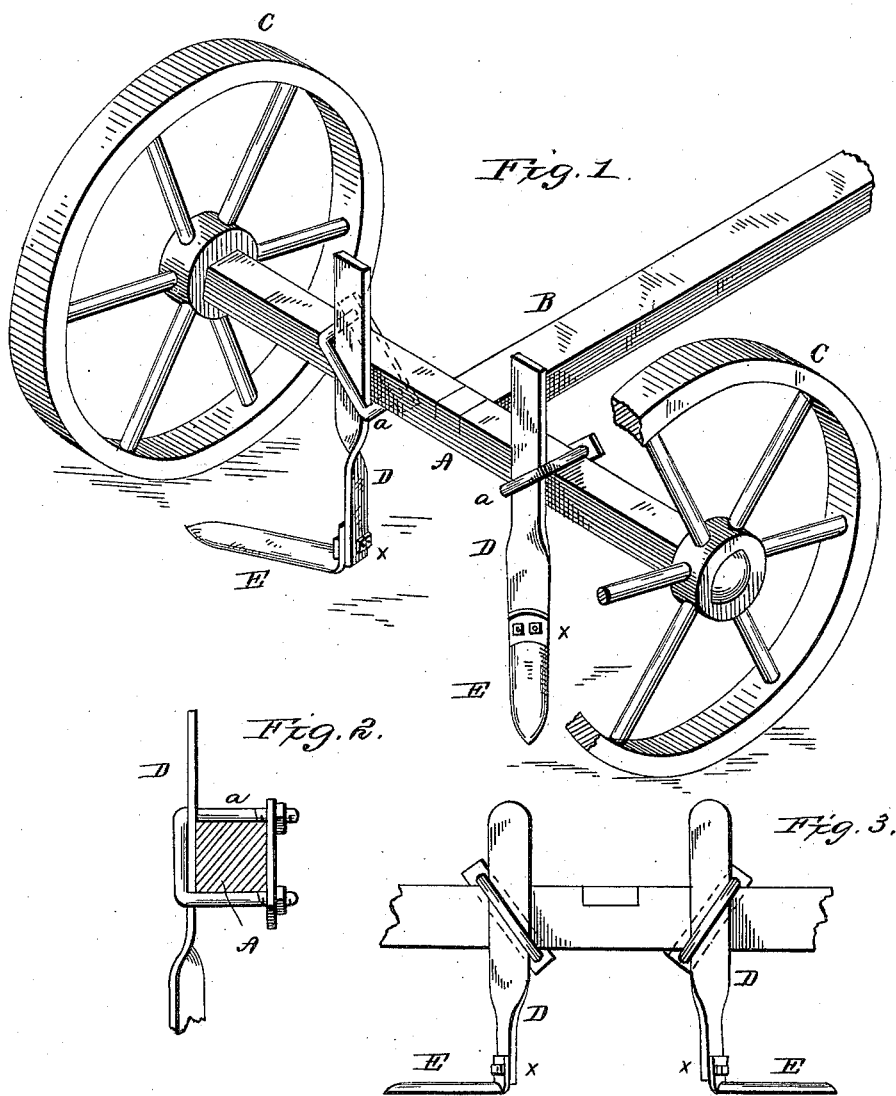

UNITED STATES PATENT OFFICE.

DANIEL CAINE, OF BATTLE CREEK, MICHIGAN.

BEAN-HARVESTER.

SPECIFICATION forming part of Letters Patent No. 302,889, dated August 5, 1884.

Application filed August 24, 1883. (No model.)

*To all whom it may concern:*

Be it known that I, DANIEL CAINE, of Battle Creek, in the county of Calhoun, and in the State of Michigan, have invented certain new and useful Improvements in Bean-Harvesters; and I do hereby declare that the following is a full, clear, and exact description thereof, reference being had to the accompanying drawings, and to the letters of reference marked thereon, making a part of this specification.

My invention relates to machines for harvesting beans; and its object is to cut the bean-vine either below or just above the surface of the earth by means of knives, which are suitably connected to a wheel-carriage in such manner as to make a shear cut at right angles to the vine-stalk, whereby the work is performed easily, economically, and effectually, as will be hereinafter more fully set forth.

In the accompanying drawings, making part of this specification, Figure 1 represents a perspective view, and Figs. 2 and 3 detached portions, showing the axle, the knives, and knife-carrying arms and their fastenings.

In the figures, A represents the axle of the machine; B, the tongue, and C C the wheels, which support and carry them.

D D represent arms, which are formed of flat bars of metal twisted in such manner that when they are secured to the axle at their upper flat end their lower ends will assume an angle of forty-five degrees to the line of draft. At right angles to the arms and at their lower extremities are bolted the knives E E, as shown at *x x*. These knives E E are made of suitable length to cut one row of beans each, and are made flat upon their under sides and oval upon their upper, or partially so. The flat sides of the bars D D are placed against the rear side of the axle, which is flat, and are then held by diagonal clips *a a*, which bind them securely in place. The clips allow the arms to be moved to or from each other upon the beans, so as to accommodate the knives to the width of the lands between the bean-rows. Each knife cuts a row of beans, and being so arranged that they move at an angle of forty-five degrees to the row, they have a draw-cut which makes the cut easy and effective. Only two knives are here shown, but more may be used, according to the length of the axle or according to distance the rows are apart. The cutting depth of the knives is easily regulated by raising or lowering the arms D D, and the angle of entering the earth may be somewhat changed by the use of wedges between the arm and the clip or the arm and the beam. The knives are made double-edged, and they may be quickly reversed when one edge becomes dull, so as to present a sharp edge to the vine. The tendency of the earth in passing the knife is to sharpen its rear edge, so that it is not often necessary to remove them from the arms for grinding purposes.

Any suitable rake device may be used directly with or may follow after this machine, for the purpose of collecting the cut vines into piles or heaps for more convenient handling.

Having thus fully described my invention, what I claim, and desire to secure by Letters Patent, is—

The twisted arms D D, having the double-edged cutting-blades E E, secured to their extremities, in combination with the axle of a wheeled vehicle, and diagonal clips *a a*, which secure the two together and allow of vertical adjustment, substantially as specified.

In testimony whereof I affix my signature in presence of two witnesses, this 5th day of May, 1883.

DANIEL CAINE.

Witnesses:
 MARTIN METCALF,
 FRANK G. REYNOLDS.